June 17, 1930. T. A. CONLON 1,764,038
SUSPENSION FOR VEHICLES
Filed Sept. 27, 1929 2 Sheets-Sheet 1

Inventor
Thomas A. Conlon
By W. N. Roach
Attorney

June 17, 1930.    T. A. CONLON    1,764,038
SUSPENSION FOR VEHICLES
Filed Sept. 27, 1929    2 Sheets-Sheet 2
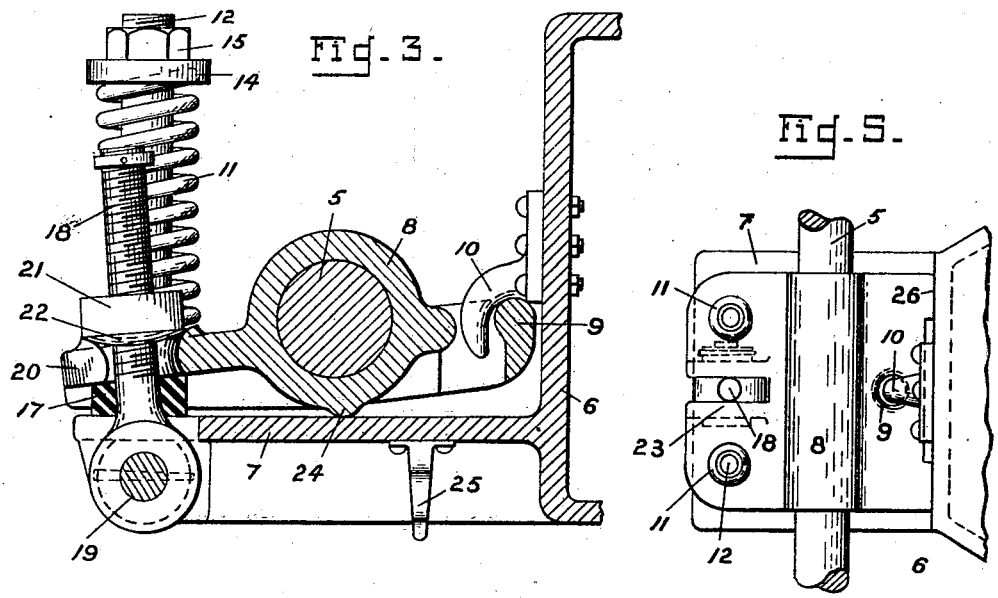
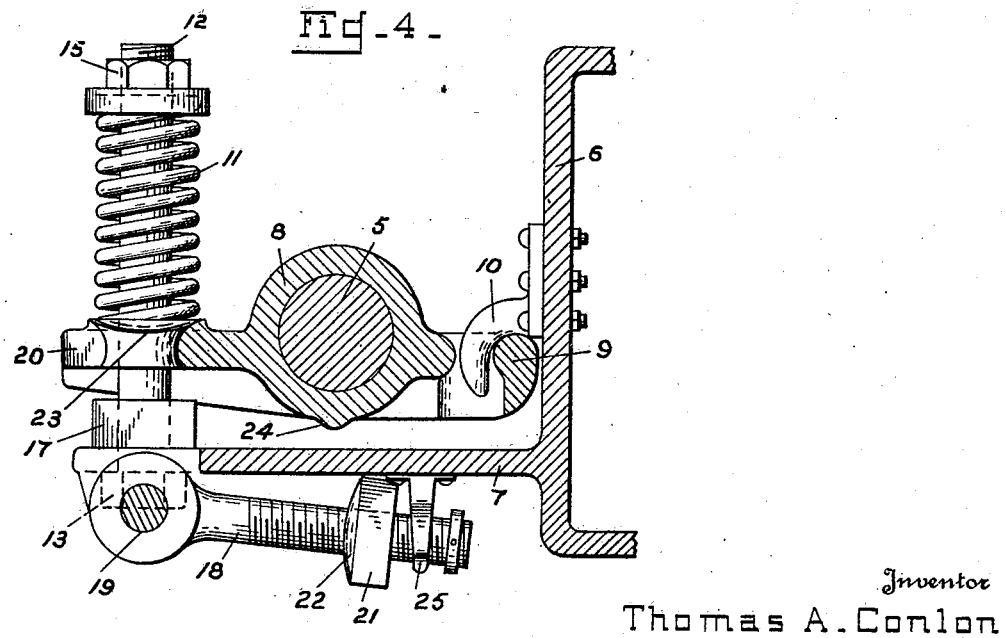
Inventor
Thomas A. Conlon
By W. N. Roach
Attorney Patented June 17, 1930

1,764,038

UNITED STATES PATENT OFFICE

THOMAS A. CONLON, OF SILVER SPRING, MARYLAND

SUSPENSION FOR VEHICLES

Application filed September 27, 1929. Serial No. 395,713.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to a suspension for vehicles.

In the construction of certain types of wheeled vehicles such as gun mounts or tractors having auxiliary attachments it is desirable that the lower carriage be connected to the axle in such a manner that the vehicle may travel over rough ground without injurious shocks and strains and that the connection may be rendered comparatively rigid or free from vibration when the gun or the work attachments are in operation.

In the travelling position the gun carriage is hung from the axle by means of suitable springs, but for firing the weight of the carriage must be relieved from the springs and a rigid or semi-rigid connection established usually by passing a pin through the axle and carriage. In providing a coupling of this character the present object has been to embody it in the elements of the suspension and thereby avoid the necessity of not only weakening the axle but complicating its fabrication.

A further object of the invention is to establish a simple and readily operable connection whereby the conversion of the vehicle from one position of adjustment to another may be quickly accomplished.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 3 is a sectional view on the line 3—3 of Fig. 1;

Fig. 4 is a similar view on the line 4—4 of Fig. 2;

Fig. 5 is a fragmentary plan view, partly in section.

Figure 1:
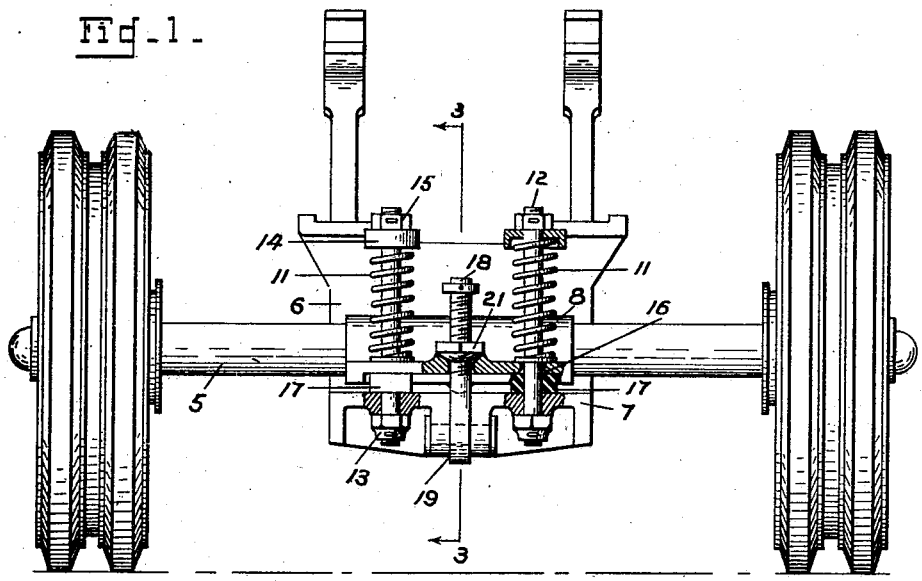
Fig. 1 is a view in front elevation of a vehicle constructed in accordance with the invention and showing the carriage in the semi-rigid or non-travelling adjustment.
Figure 2:
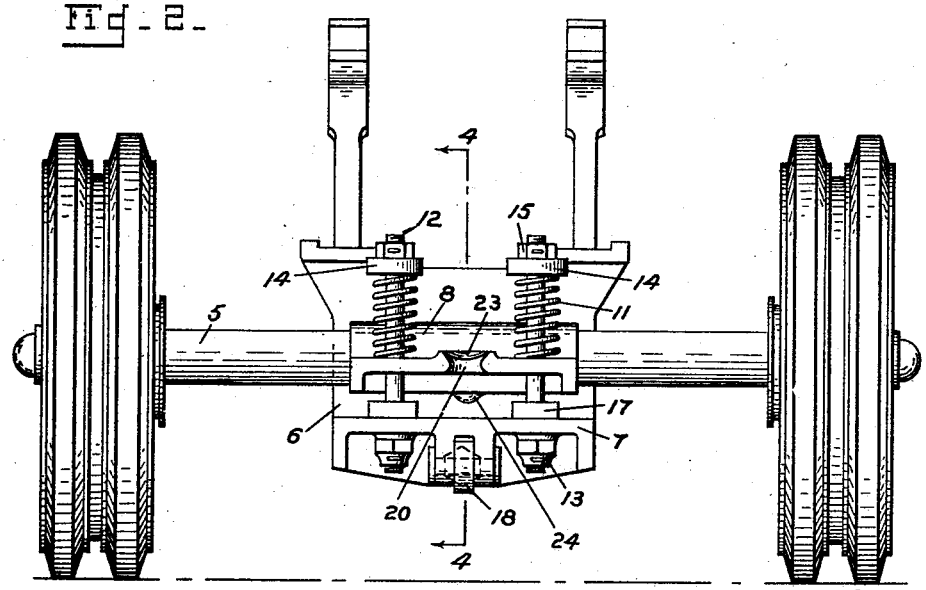
Fig. 2 is a similar view showing the carriage in the travelling position.

Referring to the drawings by numerals of reference:

The invention is illustrated in connection with a wheeled gun mount comprising an axle 5 and a bottom carriage 6 disposed at one side of the axle but having a projecting arm 7 underlying the axle.

The connection between the carriage and axle is effected through a balance beam 8 which is journaled on the axle. At one end the beam is in direct contact with the carriage by means of a lunette 9 which receives from above an inverted pintle 10 fixed to the carriage in such a manner as to be readily replaceable. At the other or disengaged end the balance beam is in yielding engagement with the carriage through helical springs 11, each of which embraces a vertical rod 12 anchored to the carriage as at 13 and is confined by a spring seat 14 retained at the upper extremity of the rod 12 by a nut 15. In order that the springs 11 may be conveniently seated on the balance beam, the rods 12 pass through apertures 16 in the arm 7.

As shown in Fig. 4, when the bottom carriage is yieldingly suspended for travelling, the balance beam is in a substantially horizontal position and a clearance exists between the projecting arm 7 and the balance beam. Resilient blocks 17 at the outer end of the arm 7 are positioned to yieldingly arrest the downward movement of the outer end of the balance beam as the carriage is elevated with respect to the axle.

The coupling for semi-rigidly connecting the carriage and axle and removing the weight of the carriage from the springs comprises a lifting screw or jack 18 trunnioned as at 19 on the extremity of the arm 7 centrally between the rods 12. In the operative position the screw 18 is swung upwardly until received in a recess 20 in the balance beam and a nut 21 having a spherical face 22 is brought against a spherical seat 23 on the upper face of the balance beam. By this means the carriage is elevated until an arcuate projection 24 on the balance beam comes into contact with the center of the bottom carriage, directly in line with the axle. This point contact will permit a transverse rocking movement of the carriage on the axle thus allowing the carriage to be maintained on a level even though the axle is inclined.

The lifting screw in inoperative position is swung underneath the arm 7 and retained in any convenient manner as by a latch 25.

Referring to Fig. 5, it will be seen that the balance beam is laterally in engagement with the carriage at each side of the pintle 10 as indicated at 26 for the purpose of maintaining the axle perpendicular to the longitudinal axis of the carriage.

In preparing the mount for firing, it is only necessary to swing the lifting screw 18 into the recess 20 of the balance beam and turn down the nut 21 until the carriage is elevated into contact with the balance beam. This procedure is reversed in restoring the mount to the travelling position.

I claim:

1. In a vehicle, an axle, a balance beam journaled thereon, a carriage having a pintle engageable with one end of the beam and having an arm underlying the beam, rods anchored in the extremity of the arm and inserted through the disengaged end of the beam, a helical spring embracing each rod and confined between the free ends of the rod and the beam, means for regulating the spring, a screw trunnioned on the outer end of the arm and movable into engaging position with respect to the beam, a nut on the screw movable to bear against the beam, and a projection on the upper face of the arm giving a pivotal contact with the center of the beam.

2. In a vehicle, an axle, a balance beam journaled thereon, a carriage having a pintle engageable with one end of the beam and having an arm underlying the beam, rods anchored in the extremity of the arm and inserted through the disengaged end of the beam, a helical spring embracing each rod and confined between the free ends of the rod and the beam, a screw trunnioned on the outer end of the arm and movable into engaging position with respect to the beam, a nut on the screw movable to bear against the beam, and a projection on the upper face of the arm giving a pivotal contact with the center of the beam.

3. A vehicle, an axle, a balance beam journaled thereon, a carriage having direct engagement with one end of the beam and having an arm underlying the beam, rods anchored in the extremity of the arm and inserted through the disengaged end of the beam, a helical spring embracing each rod and confined between the free ends of the rod and the beam, a screw trunnioned on the outer end of the arm and movable into engaging position with respect to the beam, and a nut on the screw movable to bear against the beam.

4. In a vehicle, an axle, a balance beam journaled thereon, a carriage having direct engagement with one end of the beam and having an arm underlying the beam, a yielding suspension between the extremity of the arm and the other end of the beam normally counterbalancing the weight of the carriage, a screw trunnioned at the extremity of the arm and movable into engaging position with respect to the beam and a nut on the screw movable to bear against the beam.

5. In a vehicle, an axle, a balance beam journaled thereon, a carriage having direct engagement with one end of the beam and having an arm underlying the beam, a yielding suspension between the extremity of the arm and the other end of the beam normally counterbalancing the weight of the carriage, and means associated with the beam and arm for adjusting the carriage vertical with respect to the axle.

6. In a vehicle, an axle, a balance beam journaled thereon, a carriage having direct engagement with one end of the beam and having an arm underlying the beam, a yielding suspension between the extremity of the arm and the other end of the beam normally counterbalancing the weight of the carriage, and means for inoperating the yielding element of the suspension.

7. In a vehicle, an axle, a balance beam journaled thereon, a carriage having direct engagement with one end of the beam and having an arm underlying the beam, and a yielding suspension between the extremity of the arm and the other end of the beam normally counterbalancing the weight of the carriage.

8. A vehicle, an axle, a balance beam on the axle, a carriage having engagement with one end of the balance beam, a yielding suspension establishing connection between the carriage and the other end of the balance beam and means for inoperating the yielding element of the suspension.

9. A vehicle, an axle, a balance beam on axle, a carriage having engagement with one end of the balance beam, a yielding suspension establishing connection between the carriage and the other end of the balance beam.

THOMAS A. CONLON.